United States Patent Office 3,577,405
Patented May 4, 1971

3,577,405
WATER-SOLUBLE, YELLOW MONO-AZO DYES
WITH ACTIVE METHYLENE COUPLER
Hermann Hoffmann, East Greenwich, and Helmut
Schmidt, Warwick, R.I., assignors to American Hoechst
Corporation, New York, N.Y.
No Drawing. Filed May 8, 1968, Ser. No. 727,715
Int. Cl. C07c *107/04;* C09b *29/32*
U.S. Cl. 260—193                8 Claims

ABSTRACT OF THE DISCLOSURE

Azo dyes of the formula

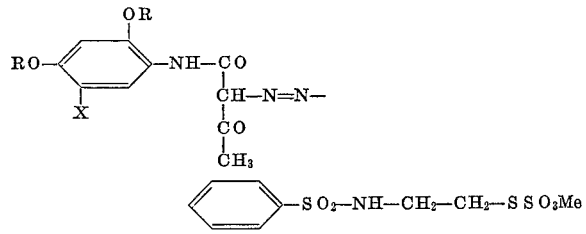

in which R stands for methyl or ethyl, X stands for hydrogen or chlorine, and Me represents an alkali metal or ammonium, are prepared by combining diazotized 2-(4' - amino-benzenesulfonylamino)-ethyl-thiosulfuric acid with a coupling component of the formula

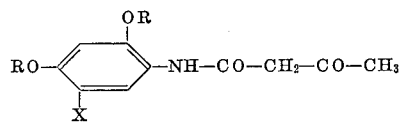

in which R stands for methyl or ethyl and X stands for hydrogen or chlorine, at a temperature between 0° C. and 20° C. and a pH between 2 and 6, which azo dyes are readily soluble in water and have good to excellent fastness when applied to native or regenerated cellulose, cellulose acetate, wool, silk, leather and synthetic materials such as polyester and especially polyamide fibers.

The present invention relates to new water-soluble, yellow azo dyestuffs containing one thiosulfuric acid group, and to a process for their preparation; more particularly it relates to dyestuffs of the formula

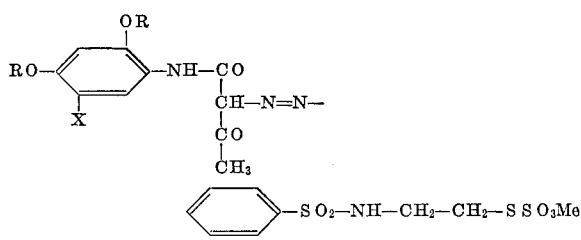

in which R stands for methyl or ethyl, X stands for hydrogen or chlorine, and Me represents an alkali metal or ammonium.

It has been known that water-soluble azo dyes containing thiosulfuric acid groups can be obtained by the reaction of diazotized aromatic amines containing thiosulfuric acid groups with compounds capable of being coupled in an acid, neutral or alkaline solution; more particularly it has been known, from U.S. Patent 3,098,064, that water-soluble azo dyes of the formula

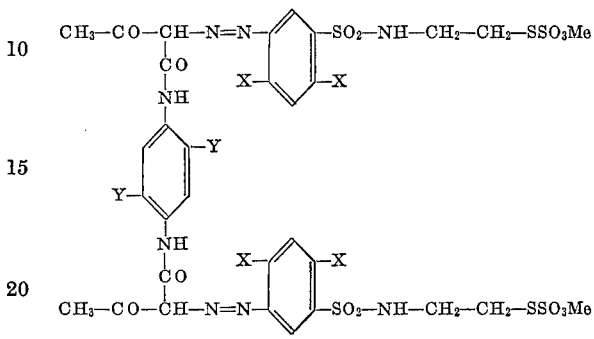

in which one X on each of the benzene rings stands for hydrogen and the other X stands for hydrogen, methyl methoxy or chlorine, one Y stands for hydrogen or methoxy and the other Y stands for hydrogen, methyl, methoxy or chlorine, and Me represents an alkali metal or ammonium, can be prepared by the reaction of diazotized aromatic amines containing a thiosulfuric acid group such as 2 - (3'-amino-benzenesulfonylamino)-ethyl-thiosulfuric acid, 2 - (3'-amino-6'-chlorobenzenesulfonylamino)-ethyl-thiosulfuric acid, 2-(3'-amino-6'-methyl-benzenesulfonylamino)-ethyl-thiosulfuric acid, 2 - (3'-amino-4'-methoxy-benzenesulfonylamino)-ethyl-thiosulfuric acid with di-(acetoacetylamino)-benzenes such as 1,4-di-(acetoacetylamino)-benzene, 1,4 - di-(acetoacetylamino)-2-chlorobenzene, 1,4 - di-(acetoacetylamino)-2-chloro-5-methoxybenzene, 2,5-di-(acetoacetylamino)-toluene, 2,5-di-(acetoacetylamino)-anisol or 2,5-di-(acetoacetylamino)-hydroquinone-dimethylether.

It has now been found that water-soluble, yellow azo dyestuffs of the formula

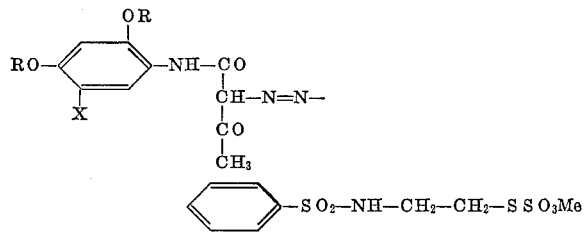

in which R stands for methyl or ethyl, X stands for hydrogen or chlorine, and Me is an alkali metal or ammonium, can be prepared advantageously by the reaction of diazotized 2 - (4'-amino-benzenesulfonylamino)-ethyl-thiosulfuric acid with an acetoacetylamino-2,4-dialkoxy-benzene such as acetoacetylamino-2,4-dimethoxy-benzene, acetoacetylamino - 2,4 - diethoxy-benzene or acetoacetylamino-2,4-dimethoxy-5-chloro-benzene.

More specifically, the coupling reaction is carried out by the addition of a solution of the coupling component in aqueous alkali to an aqueous suspension of the diazo compound at a temperature between 0° C. and 20° C. and a pH between 2 and 7. When the coupling reaction is finished, the pH of the mixture is adjusted to between 7 and 9 and the dyestuff is filtered, if necessary after the addition of salt.

Dyes obtainable according to the present invention are easily soluble in water, the solutions having very little tendency to form gels.

They can be applied to native or regenerated cellulose, cellulose acetate, wool, silk or leather as well as to synthetic materials like polyester fibers. They are especially valuable for dyeing polyamide fibers due to the high affinity they have for this material and the excellent fastness properties these dyeings exhibit.

EXAMPLE

A solution of 22 parts of sodium nitrite in 67 parts of water is added at 0° C.–2° C. within one hour to an agitated mixture of 100 parts of 2-(4'-amino-benzene-sulfonylamino)-ethyl-thiosulfuric acid, 230 parts of water, 240 parts of ice and 44 parts of concentrated hydrochloric acid. The mixture is agitated for one hour, whereafter excess nitrite is destroyed by the addition of 2–3 parts of sulfamic acid. After adjustment of the pH to 4–5 by the addition of 60 parts of sodium acetate and the necessary amount of sodium bicarbonate, a solution of 76 parts of acetoacetylamino-2,4-dimethoxy-benzene in 250 parts of water containing 16 parts of sodium hydroxide is added at 0° C.–5° C. over a period of 1–2 hours. The pH of the mixture is then adjusted to 8 by the addition of sodium hydroxide and the dyestuff is filtered and dried. Yield: 200 parts of a yellow powder which is soluble in water.

A solution of 2.0 g. of the above described dyestuff, 1.25 ml. of 25% aqueous ammonia and 4.00 g. ammonium acetate in 4000 ml. of water is heated to 30° C. 100 g. of nylon yarn are dyed in this solution for 10 minutes. The temperature is then raised to 70° C. and kept there for 30 minutes. After addition of 0.5 ml. of 56% acetic acid, the temperature is kept at 70° C. for another 15 minutes. The material is then rinsed, soaped at 70° C., rinsed again and dried. The procedure results in a brilliant yellow dyeing of greenish cast with excellent fastness to light exposure and excellent wet fastness characteristics.

The corresponding 2,4-dimethoxy-5-chloro- and 2,4-diethoxy-benzene acetoacetylamino azo dyes are obtainable by the same procedure as described in the example by using acetoacetylamino - 2,4 - dimethoxy-5-chlorobenzene and acetoacetylamino-2,4-diethoxy-benzene, respectively, as coupling components.

We claim:
1. A water-soluble, yellow azo dyestuff of the formula

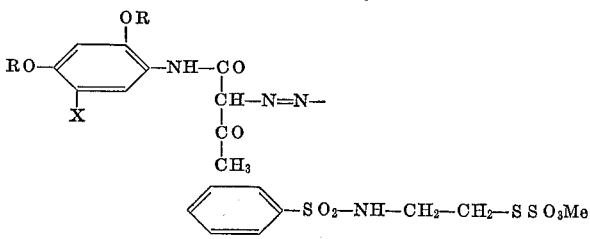

in which R stands for methyl or ethyl, X stands for hydrogen or chlorine, and Me represents an alkali metal or ammonium.

2. A dyestuff of the formula

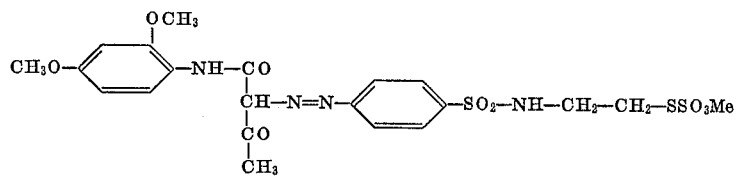

wherein Me is an alkali metal or ammonium ion.

3. A dyestuff of the formula

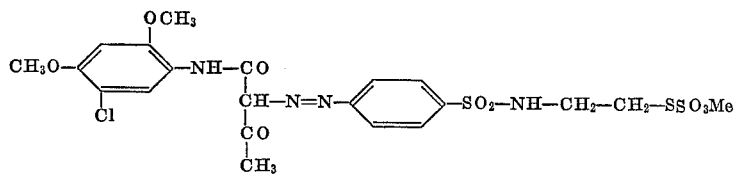

wherein Me is an alkali metal or ammonium ion.

4. A dyestuff of the formula

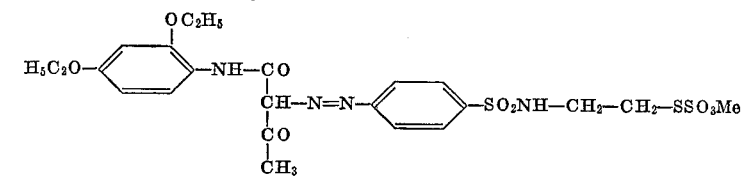

wherein Me is an alkali metal or ammonium ion.

5. A dyestuff according to claim 1 wherein Me is sodium.

6. A dyestuff according to claim 2 wherein Me is sodium.

7. A dyestuff according to claim 3 wherein Me is sodium.

8. A dyestuff according to claim 4 wherein Me is sodium.

References Cited
UNITED STATES PATENTS

| | | | |
|---|---|---|---|
| 3,098,064 | 7/1963 | Schultheis et al. | 260—176 |
| 3,132,134 | 5/1964 | Fischer et al. | 260—193 |
| 3,197,456 | 7/1965 | Kühne et al. | 260—193X |

CHARLES B. PARKER, Primary Examiner

C. F. WARREN, Assistant Examiner

U.S. Cl. X.R.

8—12, 41, 50, 51